United States Patent
Bowser et al.

(10) Patent No.: US 9,485,635 B2
(45) Date of Patent: Nov. 1, 2016

(54) DISPLAYING INFORMATION ASSOCIATED WITH CORRESPONDENCE

(71) Applicant: LENOVO (Singapore) PTE, LTD., New Tech Park (SG)

(72) Inventors: Robert A. Bowser, Cary, NC (US); John Weldon Nicholson, Cary, NC (US); Rod D. Waltermann, Rougemont, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 32 days.

(21) Appl. No.: 14/213,993

(22) Filed: Mar. 14, 2014

(65) Prior Publication Data

US 2015/0264539 A1   Sep. 17, 2015

(51) Int. Cl.
*H04W 4/00* (2009.01)
*H04W 4/14* (2009.01)
*H04L 12/58* (2006.01)

(52) U.S. Cl.
CPC ............... *H04W 4/14* (2013.01); *H04L 51/16* (2013.01)

(58) Field of Classification Search
CPC .................................................. G06F 17/30699
USPC ............................................................ 455/466
See application file for complete search history.

(56) References Cited

U.S. PATENT DOCUMENTS

| | | | |
|---|---|---|---|
| 2007/0288451 A1* | 12/2007 | Meyer | G06F 17/30616 |
| 2011/0195691 A9* | 8/2011 | Maguire et al. | 455/412.1 |
| 2012/0158853 A1* | 6/2012 | Baartman | H04L 12/581 709/206 |
| 2012/0263285 A1* | 10/2012 | Rajakumar et al. | 379/189 |
| 2013/0005405 A1* | 1/2013 | Prociw | H04M 1/72519 455/566 |
| 2013/0041890 A1* | 2/2013 | Nakayama | G06F 17/2735 707/722 |

* cited by examiner

*Primary Examiner* — Sam K Ahn
*Assistant Examiner* — Fabricio R Murillo Garcia
(74) *Attorney, Agent, or Firm* — Kunzler Law Group

(57) ABSTRACT

For displaying information associated with correspondence, a memory stores code executable by a processor. The code identifies a communication context for a communication. The communication context includes a correspondent. The code further displays information associated with the communication context. The information includes a prior communication with the correspondent.

17 Claims, 7 Drawing Sheets

205

| Correspondent ID 210 |
| Information Pointer 215 |
| Phrases 220 |
| Timestamp 225 |
| Number of References 230 |
| Popularity 235 |
| Topic 240 |
| Type 245 |
| Source 250 |
| Subject Matter 255 |
| Topic Classification 260 |

DISPLAYING INFORMATION ASSOCIATED WITH CORRESPONDENCE

BACKGROUND

1. Field

The subject matter disclosed herein relates to displaying information and more particularly relates to displaying information associated with correspondence.

2. Description of the Related Art

Communication is often initiated to share information, or to reach a decision based on information. The information must be accessible before it can be used.

BRIEF SUMMARY

An apparatus for displaying information associated with correspondence is disclosed. The apparatus includes a processor and a memory storing code executable by the processor. The code identifies a communication context for a communication. The communication context includes a correspondent. The code further displays information associated with the communication context. The information includes a prior communication with the correspondent. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
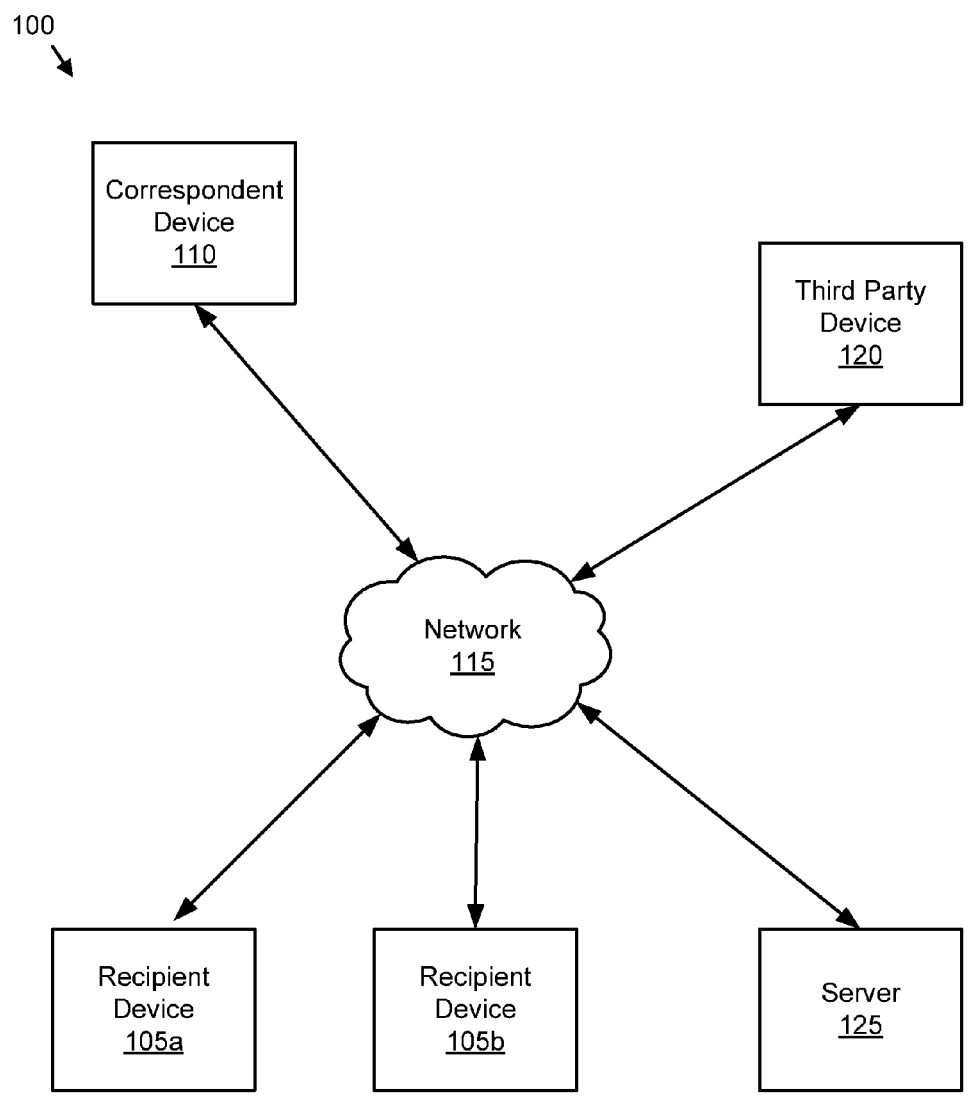
FIG. 1 is a schematic block diagram illustrating one embodiment of a communication system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

A wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application. The description of elements in each figure may refer to elements of proceeding figures. Like numbers refer to like elements in all figures, including alternate embodiments of like elements.

FIG. 1 is a schematic block diagram illustrating one embodiment of a communication system 100. The communication system includes a correspondent device 110, a third-party device 120, a network 115, one or more recipient devices 105, and a server 125. The correspondent device 110, the third-party device 120, the recipient devices 105, the server 125 may be electronic devices such as mobile telephones, computer workstations, laptop computers, tablet computers, wearable devices, and the like. The network 115 may be the Internet, a mobile telephone network, a Wi-Fi network, a local area network, a wide area network, a wireless connection, or combinations thereof.

A recipient may communicate through the recipient device 105 and the network 115 with the correspondent device 110 and a correspondent using the correspondent device 110. In one embodiment, the communication is selected from the group consisting of a telephone communication, a voice over Internet communication, an instant messaging communication, a short message service (SMS) communication, a social networking communication, and an email communication.

The communication may include sharing information, collecting information, discussing information, and/or reaching a decision based on information. The information may be selected from the group consisting of prior posts by the correspondent, prior communications referencing the correspondent, posts referencing the correspondent, a document referencing the correspondent, a document referenced by the correspondent, a document associated with the correspondent, and notes referencing the correspondent. In one embodiment, a post is one or more of a social media post, a news article, a comment, and the like.

The information may physically and/or logically reside in one or more devices. For example, if the recipient is using a first recipient device 105a for communication, information relevant to the communication may reside on a second recipient device 105b, the server 125, the third-party device 120, and/or the correspondent device 110. The communication may be enhanced if information relevant to the communication is readily available to the recipient.

Figure 2A:
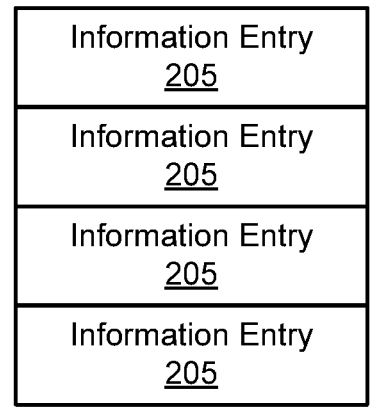
FIG. 2A is a schematic block diagram illustrating one embodiment of an information database.

The embodiments described herein identify a communication context for the communication. In addition, the embodiments display information associated with the communication context. For example, the communication may be a telephone communication regarding an email that was previously sent from the correspondent device 110 to the recipient device 105. The embodiments may identify the communication context as regarding the email and display the email and/or link to the email on the recipient device 105 so the email is readily available to the recipient as will be described hereafter FIG. 2A is a schematic block diagram illustrating one embodiment of an information database 200. The information database 200 may store the information associated with the communication context. In the depicted embodiment, the information database 200 includes a plurality of information entries 205. Each information entry 205 may be one or more of the table entry, an information pointer to a data object, a linked data structure, a flat file, or a flat file entry. The information database 200 may be stored in a memory.

In one embodiment, the recipient devices 105 may be searched for the information. Alternatively, one or more of the recipient devices 105, the server 125, the third-party device 120, and the correspondent device 110 may be searched for the information. The information may be indexed in the information database 200.

Figure 2B:
FIG. 2B is a schematic block diagram illustrating one embodiment of an information entry.

FIG. 2B is a schematic block diagram illustrating one embodiment of an information entry 205. The information entry 205 may be stored in the information database 200. In the depicted embodiment, the information entry 205 includes a correspondent identifier 210, an information pointer 215, one or more phrases 220, a timestamp 225, a number of references 230, the popularity 235, a topic 240, a type 245, a source 250, a subject matter 255, and a topic classification 260.

The correspondent identifier 210 may identify the correspondent associated with the information entry 205. In one embodiment, the correspondent identifier 210 includes contact information such as an email address, a telephone number, an instant message identifier, an account user identifier, or the like. In one embodiment, the correspondent identifier 210 also identifies the correspondent device 110.

The information pointer 215 may point to the information associated with the information entry 205. The information pointer 215 may include but is not limited to a pathname, a universal resource locator (URL), an index value, or combinations thereof.

The phrases 220 may include words parsed from the information associated with the information entry 205. In one embodiment, the words may be parsed from the information if the words also reside on a keyword list. In an alternative embodiment, the words that appear most frequently in the information may be parsed to the phrases 220. For example, if the words "quarterly budget" appear most frequently in the information, then, "quarterly budget" may be parsed to the phrases 220.

The timestamp 225 may indicate a creation date for the information. In addition, the timestamp 225 may indicate when the information was received at a recipient device 105. In one embodiment, the timestamp 225 may indicate when the information was first viewed by the recipient. In addition, the timestamp 225 may also indicate when the information was last viewed by the recipient.

The number of references 230 may indicate a number of times the information was referred to by the correspondent. In one embodiment, the number of references 230 indicates the number of times the information was referenced by the correspondent in prior communications. Alternatively, the number of references 230 may indicate the number of times information is referenced by the correspondent in the current communication.

In an alternative embodiment, the number of references 230 indicates a number of times the information was referenced by the recipient. In a certain embodiment, the number of references 230 indicates a number of times the information was referenced by the recipient while during prior communications with the correspondent.

In one embodiment, the popularity 235 indicates a popularity of the information. The popularity 235 may include a number of likes for the information, a number of comments for the information, and the like. In one embodiment, a popularity score is calculated as a function of the number of likes and a number of comments.

The topic 240 may comprise a title, subject line, and the like. The topic 240 may be parsed from the information. The type 245 of the information may be selected from a type list. The type 245 may indicate a general grouping for the information.

The source 250 may indicate an original source of the information. For example, the information may be an email from the correspondent with an attachment and/or text from the original source. The source 250 may identify the original source.

The subject matter 255 describe the subject matter of the information. In one embodiment, the subject matter 255 is assigned by recipient. Alternatively the subject matter 255 may be parsed from the information. The subject matter 255 may indicate a content grouping.

The topic classification 260 may be parsed from the information using extraction-based summarization. In one embodiment, the topic classification 260 may match a topic list.

Figure 2C:
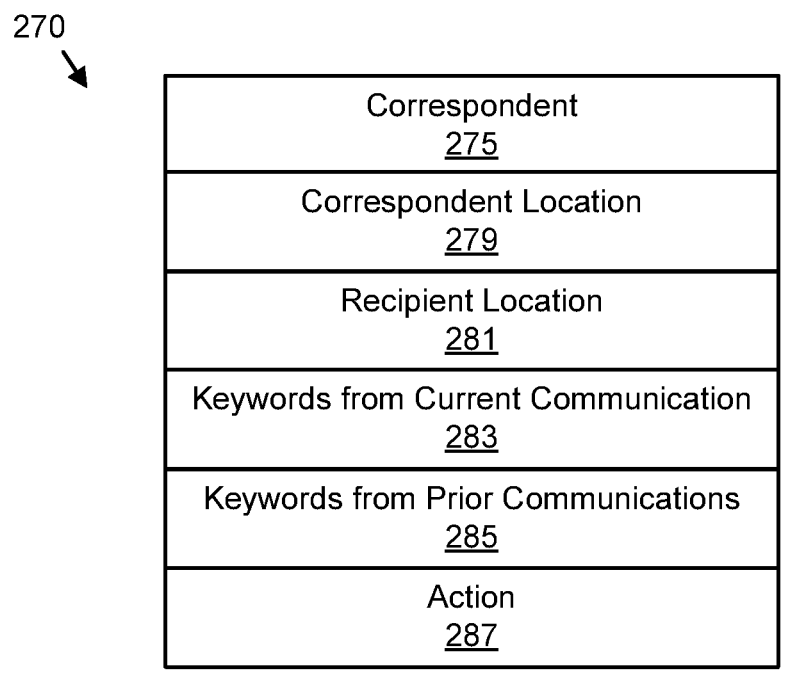
FIG. 2C is a schematic block diagram illustrating one embodiment of a communication context.

FIG. 2C is a schematic block diagram illustrating one embodiment of a communication context 270. The communication context 270 may be stored in a database, linked data structures, and/or a flat file. The communication context 270 may be stored in a memory.

In the depicted embodiment, the communication context 270 includes the correspondent 275, a correspondent location 279, a recipient location 281, keywords from the current communication 283, keywords from prior communications 285, and an action 287.

The correspondent 275 may include a correspondent name, a correspondent title, a correspondent image, a correspondent company, and correspondent notes. The correspondent 275 may be identified by a phone number, an email address, an instant messaging address, or the like. In one embodiment, the correspondent 275 is identified both by data provided by the recipient and data retrieved from other sources.

The correspondent location 279 may indicate a logical and/or physical location of the correspondent. The correspondent location 279 includes but is not limited to a telephone number, and Internet address, global positioning system (GPS) coordinates, a spoken location, and a location detected from an image of the correspondent.

The recipient location 281 may indicate a logical and/or physical location of the recipient. The recipient location 281 may include but is not limited to GPS coordinates, identities of local networks, and a location detected from an image of the surroundings of the recipient device 105.

The keywords from the current communication 283 may include keywords detected in the current conversation that match a keyword list. The keywords from the prior communications 285 may include keywords detected in prior conversations that match the keyword list.

The action 287 may be forecast from the communication context 270. For example, if the communication context 270 includes the keywords from the current communication 283 of "test results," the action 287 may be a test results document. In one embodiment, the action 287 comprises information that may be communicated to the correspondent device 110 and/or a third-party device 120.

Figure 3:
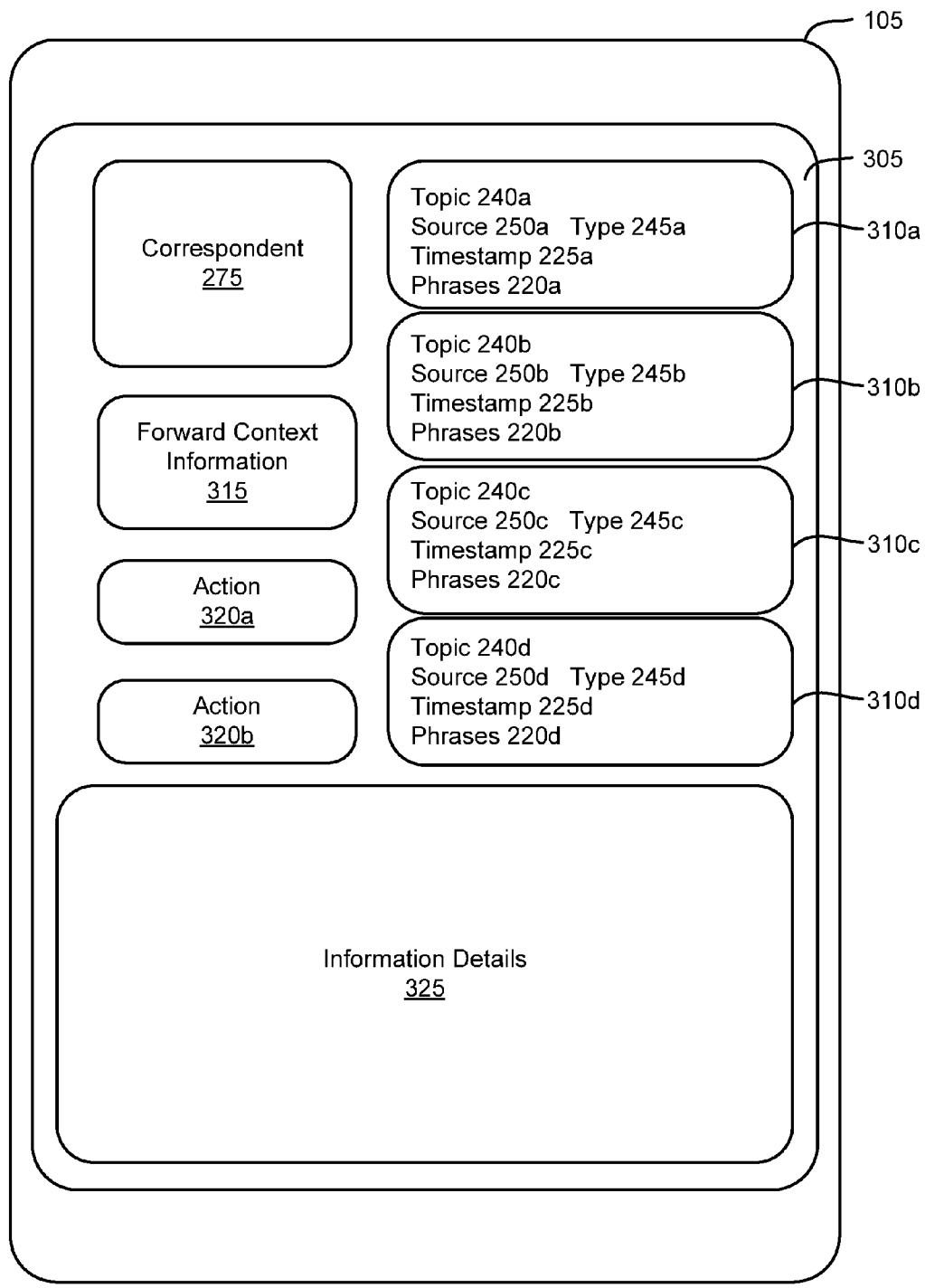
FIG. 3 is a schematic block diagram illustrating one embodiment of a communication over a recipient device.

FIG. 3 is a schematic block diagram illustrating one embodiment of a communication over a recipient device 105. The recipient device 105 may be exemplary of any electronic device. The recipient device 105 includes a display 305. The display 305 displays information 310 associated with the communication context 270. In the depicted embodiment, four information instances 310 are displayed, although any number of information instances 310 may be displayed.

In one embodiment, the communication context 270 comprises the correspondent 275. As a result, information instances 310 relating to the correspondent 275 may be displayed. In addition, the communication context may comprise topics 240, types 245, and the keywords from prior communications 285 with the correspondent 275.

During the communication, the communication context 270 may be dynamically updated with the keywords from the current communication 283. For example, if the keyword "marketing budget" is detected during the communication, the communication context 270 may be dynamically updated to include "marketing budget."

Each information instance 310 includes a topic 240, a source 250, a type 245, a timestamp 225, and phrases 220 from the information entry 205 associated with the information 310. The information 310 may be sorted. In one embodiment, the information 310 is sorted based on a criterion selected from the group consisting of the timestamp 225, the number of references 230, the popularity 235, the topic 240, the type 245, and the source 250.

In one embodiment, one or more keywords 283 may be detected during the current communication. The information 310 may be dynamically sorted based on the keywords 283. For example, the keyword "product launch" may be detected during the communication. The information instances 310 may be sorted so that the information instances 310 with the phrases 220 "product launch" and/or the topic 240 "product launch" are displayed with the highest priority.

In one embodiment, the information details 325 are displayed for an information instance 310. The information details 325 may be displayed for a highest priority information instance 310. Alternatively, the information details 325 may be displayed for an information instance 310 selected by the recipient.

The correspondent 275 displays one or more of the correspondent name, the correspondent image, the correspondent title, the correspondent company, and the correspondent notes. As a result, the recipient is reminded of important elements of the communication context 270.

The display 305 also displays a forward context information button 315. The recipient may activate the forward context information button 315 to forward the communication context 272 the correspondent device 110 and/or to the third-party device 120. The display 305 also displays two action buttons 320. The action buttons may indicate actions 270 forecast from the communication context 270 as will be described hereafter. The recipient may activate the action buttons 320 to perform the associated actions.

Figure 4:
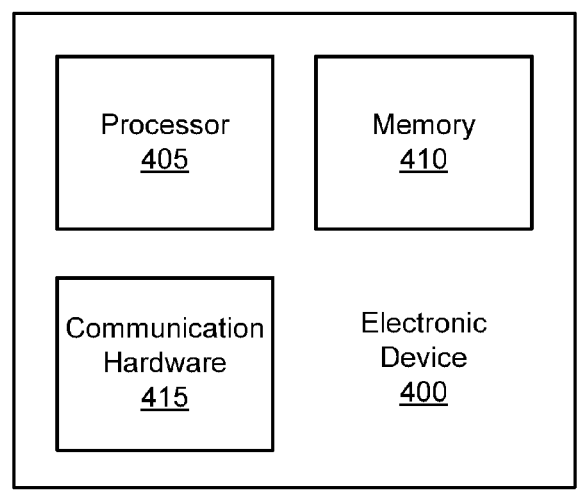
FIG. 4 is a schematic block diagram illustrating one embodiment of an electronic device.

FIG. 4 is a schematic block diagram illustrating one embodiment of an electronic device 400. The electronic device 400 may be the correspondent device 110, the third party device 120, the recipient devices 105, and/or the server 125. The electronic device 400 includes a processor 405, a memory 410, and communication hardware 415.

The memory 410 may include a semiconductor storage device, a hard disk drive, an optical storage device, a micromechanical storage device, or combinations thereof. The memory 410 may store code. The processor 405 may execute the code. The communication hardware 415 may communicate with other devices.

Figure 5:
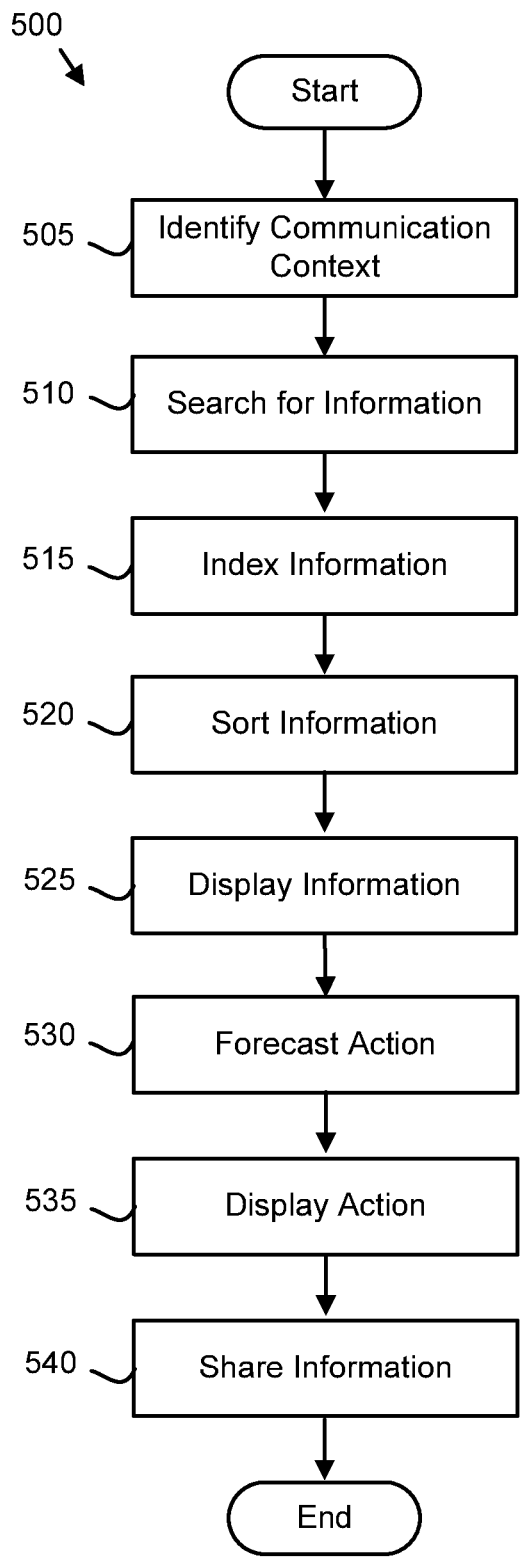
FIG. 5 is a schematic flow chart diagram illustrating one embodiment of an information display method.

FIG. 5 is a schematic flow chart diagram illustrating one embodiment of an information display method 500. The method 500 may perform the functions of the communication system 100 and/or the electronic device 400. The method 500 may be performed by use of the processor 405. Alternatively, the method 500 may be embodied in a program product. The program product may comprise a computer readable storage medium such as the memory 410 storing code. The processor 405 may execute the code to perform the method 500.

The method 500 starts, and in one embodiment, the code identifies 505 the communication context 270. The communication context 270 may comprise the correspondent 275. For example, the code may identify the correspondent 275 from the phone number of the correspondent device 110. The code may further construct the communication context 270 based on the identity of the correspondent 275.

In one embodiment, the communication context 270 comprises one or more of a correspondent location 279, a recipient location 281, keywords from the current communication 283, and keywords from prior communications 285. For example, the code may identify the correspondent location 279 from a landline telephone number of the correspondent device 110. In addition, the code may identify the recipient location 281 from the identity of a Wi-Fi network in communication with the recipient device 105.

In an alternate example, if the correspondent location 279 is an office and the recipient location 281 is another office, the communication context 270 may include work-related topics 240 and/or work-related types 245. However, if the recipient location 281 is a sports arena, the communication context 270 may include sports related topics 240 and/or sports-related types 245.

The keywords from prior communications 285 may be retrieved from information entries 205 with correspondent identifiers 210 matching the correspondent 275. The keywords from the prior communications 285 may be the phrases 220 of the information entries 205. The keywords from the current communication 283 may be detected from the communication.

In one embodiment, the code searches 510 one or more recipient devices 105 for information 310 associated with the communication context 370. In addition, the code may search 510 the server 125, the third-party device 120, and/or the correspondent device 110 for the information 310. In a certain embodiment, the code queries the server 125, the third-party device 120, and/or the correspondent device 110 for the information 310.

The code may further index 515 the information 310. In one embodiment, the code creates an information entry 205 for each information instance 310 to index 515 the information 310.

In one embodiment, the code sorts 520 the information 310. The information 310 may be sorted 520 based on one or more criteria including the timestamp 225, the number of references 230, the popularity 235, the topic 240, the type 245, the source 250, a keyword, a subject matter 255, and a topic classification 260. In one embodiment, the information 310 is dynamically sorted based on a keyword from the current communication 283.

The code may display 525 the information 310 on the display 305. In addition, the code may display 525 the correspondent 275, the forward context information button 315, the action buttons 320, and the information details 325.

In one embodiment, the code forecasts 530 an action 287 from the communication context 270. For example, if the correspondent location 279, the recipient location 281, and the keywords from the current communication 283 indicate a work-related and budget related communication, the code may forecast 530 one or more actions 287 relating to a budget. For example, an action 287 may be to send a budget document from the recipient device 105 to the correspondent device 110.

The code may further display 535 the forecast action 287. In one embodiment, the action 287 is displayed 535 as an action button 320. Activating the action button 320 may perform the action 287.

In one embodiment, the code shares 540 the information 310 and the method 500 ends. The information 310 may comprise prior communications from the correspondent 275. In one embodiment, an information instance 310 is shared with the correspondent 275 through the correspondent device 110. The recipient may select an information instance 310 from the display 305. The recipient device 105 may give the recipient the option to share 540 the information instance 310 with the correspondent. Accepting the option may communicate the information instance 310 to the correspondent device 110.

In an alternative embodiment, the code shares 540 the information 310 with a third party. For example, the recipient may select an information instance 310 from the display 305 and the recipient device 105 may give the recipient the option to share 540 the information instance 310 with the third party. The recipient device 105 may further communicate the information instance 310 to the third-party device 120 in response to the recipient selecting the option.

By identifying the communication context 270 for a current communication and displaying information 310 associated with communication context 270 the embodiments give the recipient ready access to the relevant information 310 for the communication on the recipient device 105. In addition, the embodiments provide actions 287 based on the communication context 270 and allow the recipient to easily perform the actions 287. The embodiments may also provide for the sharing of information 310 with the correspondent and/or a third party. As a result, the communication is more productive and efficient.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   identify a communication context for a current voice communication communicated over a communication network, the communication context comprising a correspondent and a keyword detected in the current voice communication and that matches a keyword list from the current voice communication;
   index a plurality of documents that are referenced in prior communications with the correspondent and that comprise the keyword;
   sort the plurality of documents based on criteria comprising a timestamp and a number of times each document is referred to by the correspondent in the prior communications;
   forecast a send document action comprising sending a highest ranked document from the sorted plurality of documents to the correspondent; and
   display the send document action as an action button that sends the document to the correspondent.

2. The apparatus of claim 1, wherein the processor further sends the document to a third party in response to the action button.

3. The apparatus of claim 1, the communication context further comprising one or more of a correspondent location, a recipient location, and a keyword from the prior communication.

4. The apparatus of claim 1, wherein the communication context is dynamically updated with the keyword from the current communication.

5. The apparatus of claim 1, wherein the processor further displays a prior post by the correspondent and a note referencing the correspondent.

6. A method comprising:
   identifying, by use of a processor, a communication context for a current voice communication communicated over a communication network, the communication context comprising a correspondent and a keyword detected in the current voice communication and that matches a keyword list from the current voice communication;
   indexing a plurality of documents that are referenced in prior communications with the correspondent and that comprise the keyword;
   sorting the plurality of documents based on criteria comprising a timestamp and a number of times each document is referred to by the correspondent in the prior communications;
   forecasting a send document action comprising sending a highest ranking document from the sorted plurality of documents to the correspondent; and
   displaying the send document action as an action button that sends the document to the correspondent.

7. The method of claim 6, the communication context further comprising one or more of a correspondent location, a recipient location, and a keyword from the prior communication.

8. The method of claim 6, wherein the communication context is dynamically updated with the keyword from the current communication.

9. The method of claim 6, the method further comprising sorting documents with the keyword.

10. The method of claim 9, wherein the documents are dynamically sorted based on the keyword from the current communication.

11. The method of claim 10, wherein the documents are further sorted by a criterion comprising a popularity, a topic, a type, a source, a keyword, a subject matter, and a topic classification.

12. The method of claim 6, the method further displaying a prior post by the correspondent and a note referencing the correspondent.

13. The method of claim 6, wherein the communication is selected from the group consisting of a telephone communication, a voice over Internet communication, an instant messaging communication, a short message service (SMS) communication, a social networking communication, and an email communication.

14. The method of claim 6, the method further comprising:
   searching one or more recipient devices for the prior communications with the correspondent.

15. The method of claim 6, the method further comprising sending the document to a third party in response to the action button.

16. A non-transitory computer readable storage medium that stores code executable by a processor to perform:
   identifying a communication context for a current voice communication communicated over a communication network, the communication context comprising a correspondent and a keyword detected in the current voice communication and that matches a keyword list from the current voice communication using voice recognition;
   indexing a plurality of documents that are referenced in prior communications with the correspondent and that comprise the keyword;
   sorting the plurality of documents based on criteria comprising a timestamp and a number of times each document is referred to by the correspondent in the prior communications;
   forecasting a send document action comprising sending a highest ranking document from the sorted plurality of documents to the correspondent; and
   displaying the send document action as an action button that sends the document to the correspondent.

17. The non-transitory computer readable storage medium of claim 16, wherein the processor further sends the document to a third party.

* * * * *